United States Patent [19]

Rampe

[11] Patent Number: 4,722,722
[45] Date of Patent: Feb. 2, 1988

[54] ROTATABLE DRIVE MEMBER FORMED FROM INJECTION MOLDED PLASTICS MATERIAL WITH PREFORM INSERT

[75] Inventor: John F. Rampe, Bratenahl, Ohio

[73] Assignee: Jepmar Research, Fairport Harbor, Ohio

[21] Appl. No.: 879,578

[22] Filed: Jun. 27, 1986

[51] Int. Cl.[4] .......................................... F16H 55/00
[52] U.S. Cl. .................................... 474/161; 474/192
[58] Field of Search ............................... 474/190–192, 474/902, 903, 161, 94; 29/159 R

[56] References Cited

U.S. PATENT DOCUMENTS

| | | | |
|---|---|---|---|
| 3,010,333 | 11/1961 | Rampe | 74/230.17 |
| 3,200,665 | 8/1965 | Wells | 474/161 X |
| 3,272,027 | 9/1966 | Wayman | 474/161 X |
| 3,830,577 | 8/1974 | Rampe et al. | 403/378 |
| 4,217,944 | 8/1980 | Pascal | 474/192 X |

FOREIGN PATENT DOCUMENTS 0094168  6/1982  Japan .................................... 474/190

Primary Examiner—Stephen J. Novosad
Assistant Examiner—Thuy M. Bui
Attorney, Agent, or Firm—David A. Burge

[57] ABSTRACT

A rotary drive member such as a gear or pulley has a hub portion that can be mounted on a shaft for rotation about the axis of the shaft, a rim portion that can be engaged by another drive member such as a gear, chain or belt as the rotary drive member rotates about the axis of the shaft, and a radially extending web that rigidly interconnects the hub and rim portions. The rotary drive member is formed by injection molding plastics material to provide a unitary, one-piece plastics member that envelops selected portions of a pair of inner and outer insert members that extend concentrically about the shaft rotation axis and that are formed from metal. The inner insert takes the form of an elongate, tubular metal sleeve that defines inner diameter portions of the hub portion of the rotary member. The outer insert takes the form of an annular metal disc that extends radially with respect to the shaft rotation axis to define portions of the radially extending web. The injection-molded plastics member envelopes the periphery of the tubular inner insert, envelopes inner and outer diameter regions of the annular outer insert, serves to rigidly drivingly interconnect the inner and outer inserts, and defines selected parts of the hub and rim portions of the rotary drive member including a drive formation on the rim for engaging another drive member such as a gear, chain or a belt.

30 Claims, 30 Drawing Figures

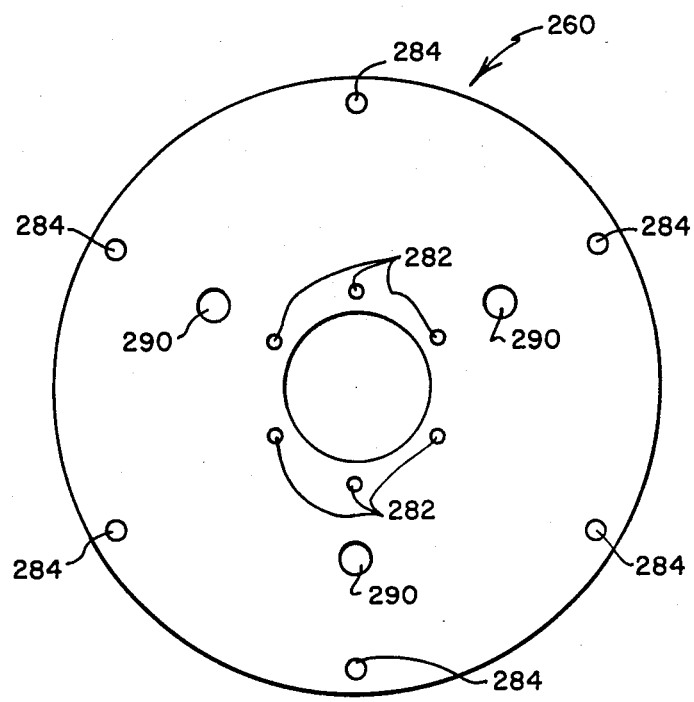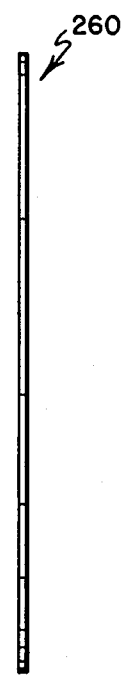
FIG. 17　　　　FIG. 18
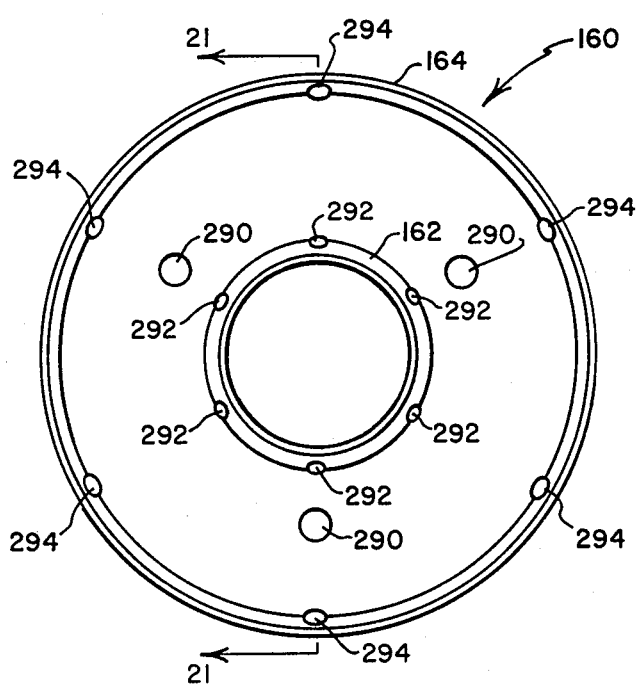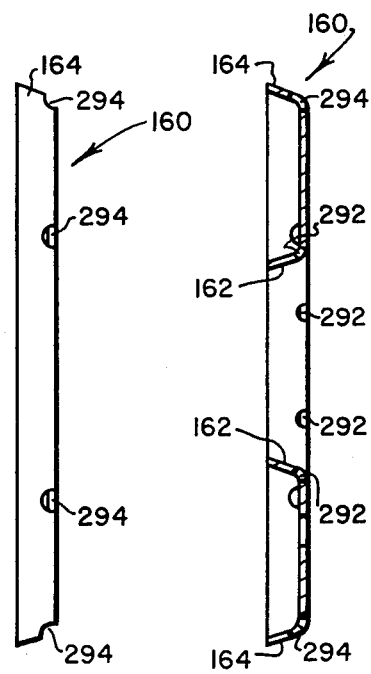
FIG. 19　　　FIG. 20　FIG. 21

ROTATABLE DRIVE MEMBER FORMED FROM INJECTION MOLDED PLASTICS MATERIAL WITH PREFORM INSERT

REFERENCE TO RELEVANT PATENTS

Reference is made to the following patents that are relevant to the present invention, the disclosures of which are incorporated herein by reference, namely:

VARIABLE PITCH SHEAVE, U.S. Pat. No. 3,010,333 issued Nov. 28, 1961 to John F. Rampe, referred to hereinafter as the "Variable Pitch Pulley Patent;" and, METHOD AND MEANS FOR CONNECTING AN APERTURED PART TO A SHAFT, U.S. Pat. No. 3,830,577 issued Aug. 20, 1974 to John Rampe et al, referred to hereinafter as the "Clamped Pin Connection Patent."

BACKGROUND OF THE INVENTION

1. Field of the Invention

The present invention generally relates to a rotary drive member such as a wheel, pulley or gear that can be mounted on a shaft for transferring torque typically to and from the shaft. More particularly, the present invention relates to a rotary drive member such as a wheel, pulley or gear that is formed by injection molding plastics material in a mold that contains one or more preform inserts so that the molded plastics material envelops selected portions of the preform insert or inserts. Preferably the insert or inserts are formed from metal such as steel, and the rotary drive member is a pulley that has a hub and a rim, with one of the inserts being a sleeven-like member that defines hub portions which are engageable with and mountable on a shaft, with the other insert being an annular disc that forms a web which interconnects the hub and the rim, and with the molded plastics material defining a toothed drive formation on the periphery of the rim.

2. Prior Art

Rotary drive members such as wheels, pulleys and gears that are mountable on a shaft for rotation about the axis of the shaft typically have been formed either from metal or from injection molded plastics material. Forming a rotary drive member from metal has the advantage of providing a strong, rigid structure that can be configured to transfer relatively large torque for example between a shaft on which the drive member is mounted and another drive member such as a gear or an endless belt that engages the rotary drive member. Forming a rotary drive member from injection molded plastics material has the advantage of providing a relatively lightweight structure that is formed at relatively low cost.

It is known also to form one or more parts of a rotary drive member such as a pulley from injection molded plastics material, and to use the molded part or parts in combination with one or more separately formed metal parts to provide a rotary drive member that is an assembly of plastic and metal components. For example, the referenced Variable Pitch Pulley Patent discloses the use of separately formed metal and plastic parts to provide a pulley that has a sleeve-like hub liner which has a non-circular outer surface that drivingly engages matingly configured hub portions of a pair of disc-like sheaves that are formed from plastics material. The metal hub liner is defined by an elongate sleeve-like part having a circular inner surface that is configured to receive a shaft on which the hub of the pulley can be mounted. The sheaves are movable relative to each other to define a belt-receiving groove therebetween that is of adjustable width for receiving an endless V-belt. The adjustable spacing of the sheave structures enables the pulley to assume different effective pitch diameters for drivingly engaging a V-belt.

In the preferred practice of the invention of the referenced Variable Pitch Pulley Patent, a selected one of the sheaves is rigidly connected to the metal hub liner (and to a shaft on which the pulley is mounted) by threaded fasteners such as set screws that extend through aligned holes which are formed in the metal hub liner and in an adjacent hub portion of the selected sheave. A variety of other devices for connecting wheels, gears, pulleys and the like to shafts are known, including keys that extend in aligned keyway formations, and pins that extend through aligned holes. The referenced Clamped Pin Connection Patent discloses still another connection method that uses a crimped endless band to force a hardened pin point into the material of a shaft to establish a driving connection between the shaft and a gear or pulley that is carried on the shaft.

It has long been accepted by those skilled in the art that if components of metal and plastics materials are to be utilized together to form a rotary drive member, these components should be preformed separately and then assembled. However, because the separate forming of mating metal and plastic components requires the accurate forming of mating configurations that will fit together snugly in order to establish proper driving connections, the high cost and difficulty of properly forming and assembling wheels, gears and pulleys that are made from a combination of metal and plastic parts often has precluded the use of such assemblies.

SUMMARY OF THE INVENTION

The present invention overcomes the foregoing and other drawbacks of the prior art by providing a novel and improved rotary drive member such as a wheel, gear or pulley that is formed by injection molding plastics material to envelop selected portions of at least one preform insert.

Preferably two preform inserts made of metal such as steel are inserted into an injection mold to form a rotatable drive member that is a combination plastic and metal structure. One of the metal preform inserts is a tubular sleeve that defines portions of a hub of the rotatable drive member. The other of the metal preform inserts is an annular disc that defines portions of a radially extending web that serves to rigidly connect hub and rim portions of the rotatable drive member. The injection molded plastics material envelopes peripheral portions of the tubular sleeve as well as inner and outer edge portions of the annular disc, and defines a drive formation on the rim for engaging another drive member such as a gear or an endless belt.

Preferably the annular disc has inner edge portions that extend into close proximity with outer surface portions of the tubular sleeve, and outer edge portions that extend into close proximity with the drive formation of the rim. The inner and outer edge portions of the annular disc, and the outer surface portions of the tubular sleeve have formations that help to establish rigid driving connections between the preform metal inserts and the enveloping plastics material. By this arrangement, a rotary drive member is provided that can be formed quite inexpensively as a combination of metal and plastics materials, and yet is capable of transmitting relatively high torque for example between a shaft on which the member is mounted and a drive element that engages the drive formation of the rim.

In accordance with the most preferred practice of the present invention, a gear or pulley is formed which is of the type that has (1) a generally tubular hub for receiving a shaft and for connecting the rotary drive member to the shaft, (2) an annular web of relatively thin cross section that extends radially outwardly from the hub, and (3) a circumferentially extending rim that connects with the periphery of the web and defines a drive formation for engaging another drive member such as a gear or an endless belt. Two metal inserts are used to define portions of the rotary drive member. One of the metal inserts is a tubular sleeve that has an inner surface and an outer surface, with the inner surface perferably defining the interior of the hub, and with the outer surface providing a non-circular configuration that has groove-like indentations formed at spaced positions about the outer surface so that, when the plastics material is molded to envelop the outer surface of the tubular sleeve, the sleeve is rigidly connected to the plastics material, and a secure driving relationship is established between the sleeve and the molded plastics material. The other of the metal inserts is an annular disc-like element that defines portions of the web and has inner and outer edge portions that define, respectively, inner and outer diameters of the disc-like element. Preferably the disc-like element is formed from a blank of planar sheet metal that is stamped to bend the inner and outer edge portions out of the plane of such radially extending web portions as connect the inner and outer edge portions. The inner and outer edge portions of the stamped disc-like element are preferably provided with formations that aid in establishing secure driving connections with such portions of the molded plastics material as envelop (1) the inner edge portions in the vicinity of the outer surface of the sleeve, and (2) the outer edge portions in the vicinity of the rim.

By the arrangement described above, a lightweight rotary drive member is formed quite inexpensively as a combination of molded plastics material and a preform insert or inserts, with the molded plastics material enveloping selected portions of the preform insert or inserts, and with the molded plastics material defining a rim having a drive formation thereon for engaging one or more other drive members.

A significant feature of the invention lies in the provision of a simple and inexpensive method for forming rotary drive members that are capable of transmitting relatively high torques, for example between shafts on which the rotary drive members are mounted and drive elements that engage the drive formations which are provided on the rims of the rotary drive members.

A further feature of the preferred practice of the invention resides in the provision of inexpensively formed rotary drive members that have radially extending webs which are defined principally by stamped metal discs that are securely, rigidly connected to hub and rim portions that are molded from plastics materials, whereby the stamped metal discs perform much of the function of transmitting torque forces between the hub and the rim.

Still another feature of the preferred practice of the invention resides in the use of a metal disc-like member to form radially extending web portions of a rotary drive member, with opposed sides of the metal disc-like member being exposed (i.e., not covered by or embedded within molded plastics material) at selected locations whereby direct metal-to-metal connections can be made between the exposed web portions and other adjacent rotary components as by extending threaded fasteners and the like through holes that are formed in the exposed metal web portions.

A further feature of the present invention is its particularly advantageous use in the formation of toothed pulleys for use with what are referred to as "timing belts." A "timing belt" has an inner surface that is provided with a regularly spaced array of tooth formations which extend into grooves defined by similarly configured toothed outer surfaces that are provided on timing belt pulleys. The advantages found in timing belt drives (as compared with gear drives, V-belt drives, roller chain and sprocket drives, etc.) are relatively low cost, light weight construction, low noise, zero backlash, and no requirement for lubrication. Timing belt drives provide a positive drive without a need for high belt tension, and these drives have a long life as compared with V-belt drives. Because timing belt drives feature these and other advantages, they are being utilized to an increasing degree to replace other kinds of drives. The system of the present invention has particular value because it provides a means for forming timing belt pulleys of almost any useful size (extending from a fraction of an inch in diameter to a diameter of several feet), and because it can be utilized to form timing belt pulleys that are capable of transmitting 15 to 20 horsepower and more.

BRIEF DESCRIPTION OF THE DRAWINGS

These and other features, and a fuller understanding of the invention may be had by referring to the following description and claims, taken in conjunction with the accompanying drawings, wherein:

FIG. 17 is a side elevational view of a blank of metal from which a preform disc-like insert of the type utilized in the rotary drive member of FIGS. 1-10 can be formed;

FIG. 18 is an end elevational view thereof;

FIG. 19 is a side elevational view of a disc-like preform metal insert of the type utilized in the rotary drive member of FIGS. 1-10;

FIG. 20 is an end elevational view thereof;

FIG. 21 is a sectional view as seen from a plane indicated by a line 21—21 in FIG. 19;

DESCRIPTION OF THE PREFERRED EMBODIMENT

Figure 1:
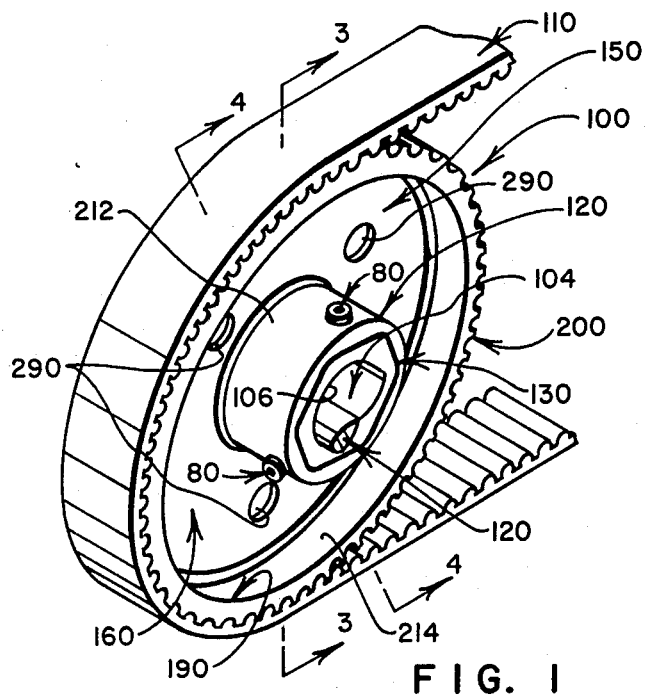
FIG. 1 is a perspective view showing one side of a rotary drive member that embodies the preferred practice of the present invention, with the member having a hub portion that is mounted on a shaft, and having a rim portion that defines a toothed drive formation which is shown in driving engagement portions of a toothed endless timing belt.

Referring to FIGS. 1-4, a rotary drive member in the form of a timing belt pulley 100 is shown that embodies the preferred practice of the present invention. The timing belt pulley 100 is depicted as being mounted on a shaft 102. The shaft 102 has an outer surface 104 of essentially constant diameter that extends through a hole 106 that is formed centrally through the pulley 100. Portions of an endless timing belt 110 are shown reeved around peripheral portions of the pulley 100.

In overview, the pulley 100 includes a generally tubular hub 120 that defines the through-hole 106 that receives the shaft 102. Set screws 80 are threaded through holes 108 that are formed in the hub 120, with inner end regions of the set screws 80 being tightened into engagement with the outer surface 104 of the shaft 102 for connecting the pulley 100 securely to the shaft 102. The pulley 100 additionally includes an annular web 150 that is of relatively thin cross section and that extends radially outwardly from the hub 120. A ring-like rim 190 connects with and surrounds the periphery of the web 150. The rim 190 defines a drive formation 200 that is shown as taking the form of a toothed outer circumference that is configured to mate with and drivingly engage another drive member such as a gear (not shown) or the endless timing belt 110.

Selected structural portions of the pulley 100 are defined by a pair of preform metal inserts 130, 160. Specifically, a tubular, sleeve-like inner insert 130 is loosely surrounded by an annular, disc-like outer insert 160. The inner insert 130 is preferably formed as a cut-off length of tubular steel stock which is preformed to provide the central mounting hole 106 and a generally hexagonal outer surface 132. The outer insert 160 is preferably formed by stamping a flat blank of sheet metal stock (designated by the numeral 260 in FIGS. 17 and 18) to give the outer insert 160 the desired annular configuration (shown in FIGS. 19-21), and to cause radially inner and outer edge portions 162, 164 of the insert 160 to be bent out of the plane of the majority of the material of the insert 160 which forms a central web 166.

Figure 3:
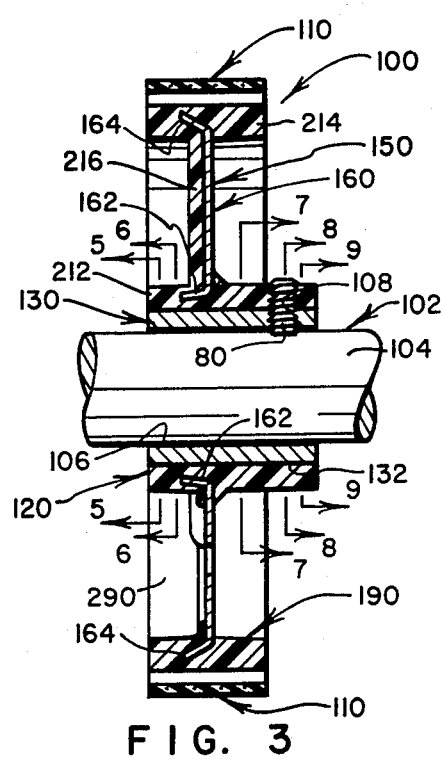
FIGS. 3 and 4 are sectional view as seen from planes indicated by lines 3—3 and 4—4 in FIGS. 1 and 2.
Figure 2:
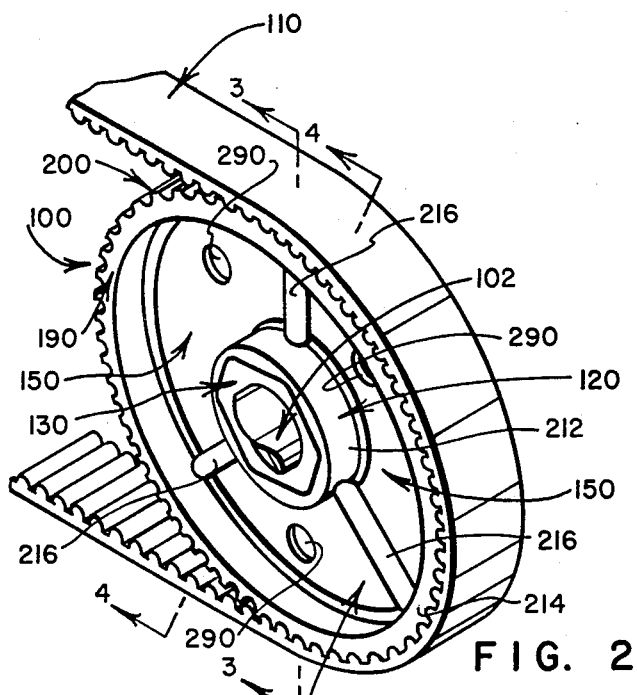
FIG. 2 is a perspective view of the components of FIG. 1 showing the opposite side of the rotary drive member.

Referring to FIG. 3, portions of the inserts 130, 160 are enveloped by plastics material. Specifically, the outer surface 132 of the sleeve-like inner insert 130 is surrounded and enveloped by plastics material that is designated by the numeral 212, while the radially inner and outer edge portions 162, 164 of the insert 160 are surrounded and enveloped by plastics material that is designated by the numerals 212, 214 respectively. Additionally, three spokes of plastics material 216 (see FIG. 2) extend along one side of the outer insert 160 to interconnect the plastics material 212, 214 that surrounds the inner and outer edge portions 162, 164 of the insert 160.

The method by which the combination metal and plastic pulley 100 is formed in accordance with the system of the present invention will be discussed after features of the components described above are discussed in greater detail.

Figure 10:
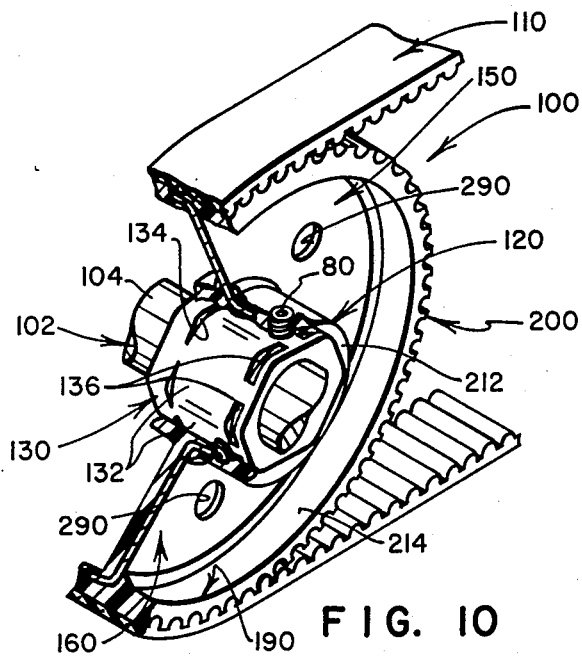
FIG. 10 is a perspective view similar to FIG. 1 but with portions of the rotary drive member and the timing belt being broken away.
Figure 11:
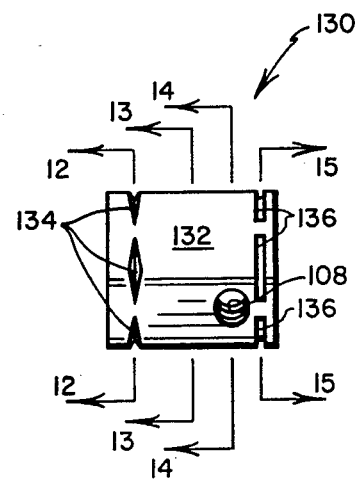
FIG. 11 is a side elevational view of a preform sleeve-like insert that is utilized in the rotary drive member of FIGS. 1-10.
Figure 12:
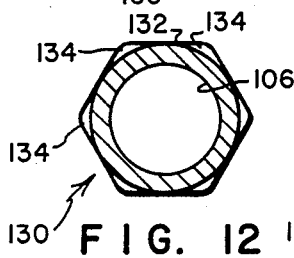
FIGS. 12, 13, 14 and 15 are sectional views as seen from planes indicated by lines 12—12, 13—13, 14—14 and 15—15 in FIG. 11.
Figure 13:
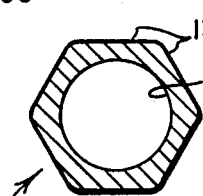
Figure 14:
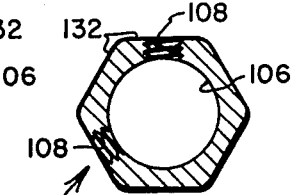
Figure 15:
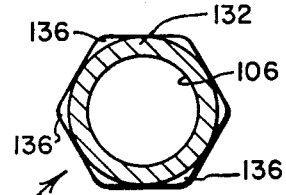
Figure 16:
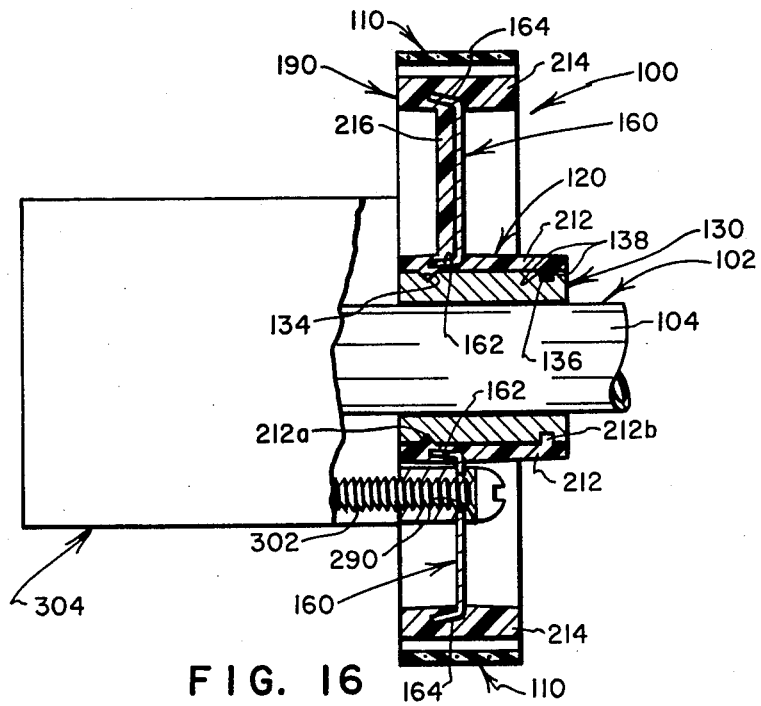
FIG. 16 is a sectional view similar to FIG. 3 but showing how other adjacent rotary mechanisms can be fastened to exposed metal web portions of the rotary member for rotation therewith.
Figure 22:
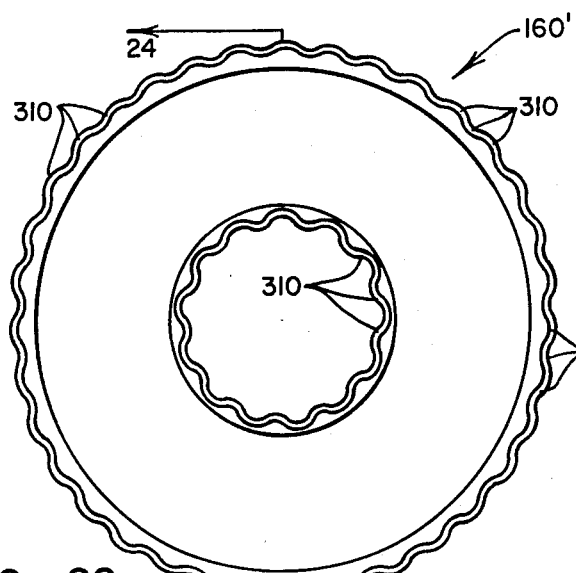
FIG. 22 is a side elevational view of an alternate embodiment of a preform disc-like metal insert.
Figures 23, 24:
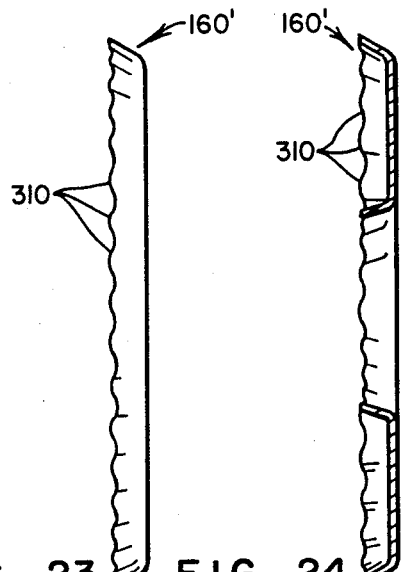
FIG. 23 is an end elevational view thereof.
FIG. 24 is a sectional view as seen from a plane indicated by a line 21—21 in FIG. 22.
Figure 25:
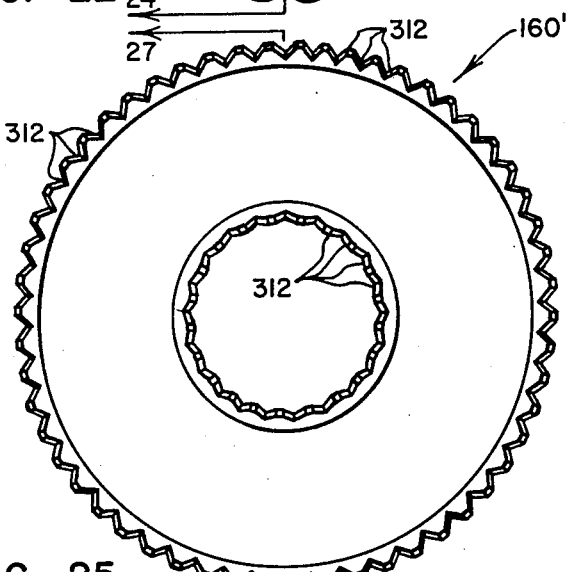
FIG. 25 is a side elevational view of still another alternate embodiment of a preform disc-like metal insert.
Figures 26, 27:
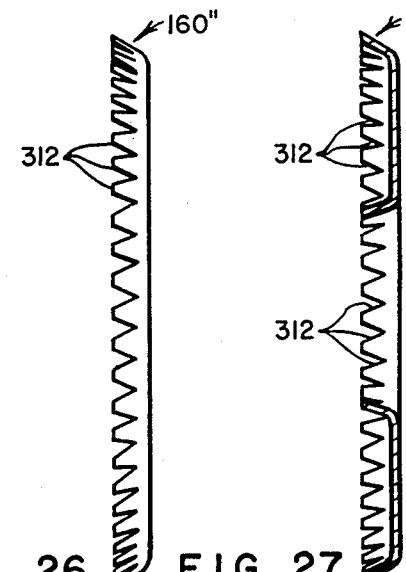
FIG. 26 is an end elevational view thereof.
FIG. 27 is a sectional view as seen from a plane indicated by a line 27—27 in FIG. 25.
Figure 28:
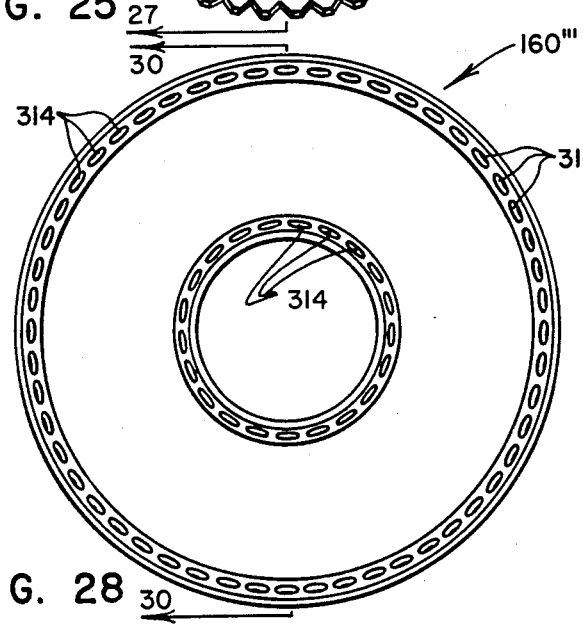
FIG. 28 is a side elevational view of still another alternate embodiment of a preform disc-like metal insert.
Figures 29, 30:
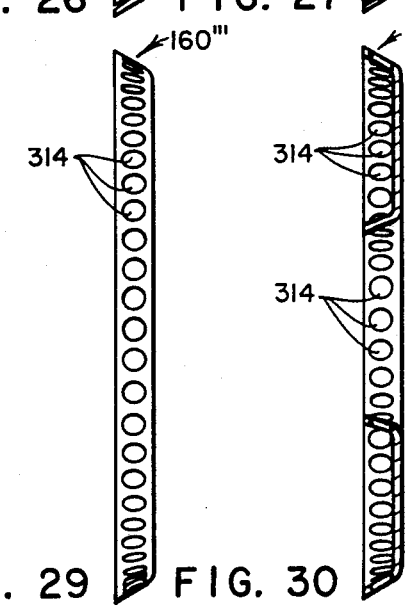
FIG. 29 is an end elevational view thereof.
FIG. 30 is a sectional view as seen from a plane indicated by a line 30—30 in FIG. 28.

Referring principally to FIGS. 10 and 11, the sleeve-like inner insert 130 preferably is of substantially uniform cross section along its length except at two axially spaced locations where ring-like arrays of short groove segments 134, 136 are formed in the outer surface. Referring to FIGS. 13 and 15 in conjunction with FIGS. 10 and 11, it will be seen that the groove segments 134 and 136 extend to substantially uniform depths. However, as is best seen by referring to FIGS. 4 and 16, the groove segments 134 are of generally V-shaped configuration, while the groove segments 136 are of generally U-shaped configuration, with opposed side walls 138 of the groove segments 136 extending in parallel, spaced planes that orthogonally intersect the central axis of the elongate tubular sleeve-like inner insert 130.

Figure 4:
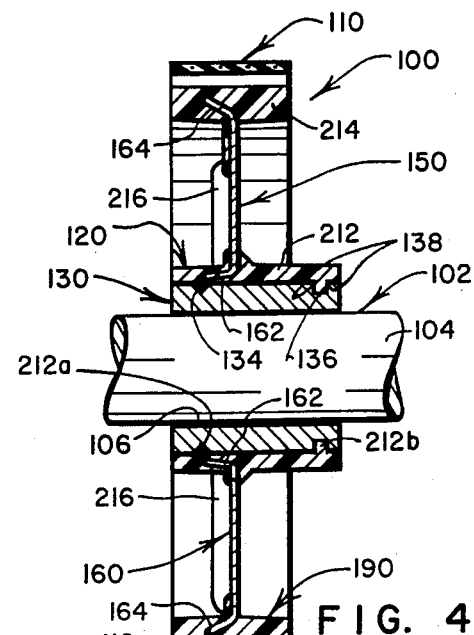
Figure 5:
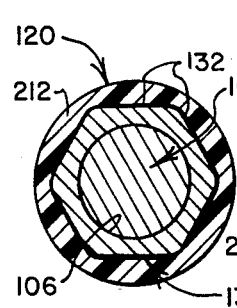
FIGS. 5, 6, 7, 8 and 9 are sectional views as seen from planes indicated by lines 5—5, 6—6, 7—7, 8—8 and 9—9 in FIG. 3.
Figure 6:
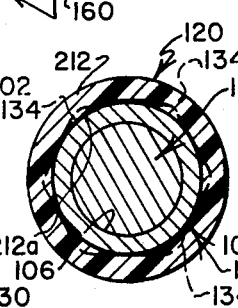
Figure 7:
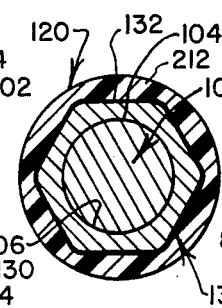
Figure 8:
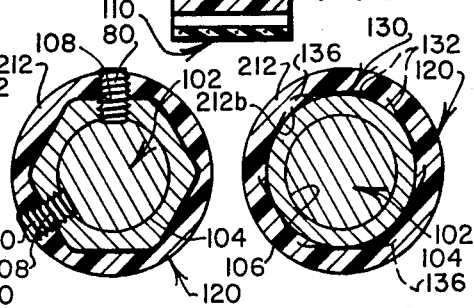
Figure 9:
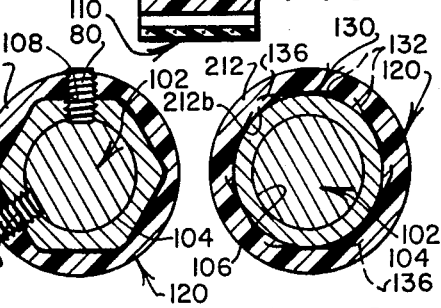

Referring to FIGS. 4, 6 and 9, the groove segments 134, 136 that are provided in the outer surface of the inner insert 130 are matingly engaged by correspondingly configured projections 212a, 212b that are formed by the plastics material 212 that envelops the outer wall of the inner insert 130. The mating engagement of the plastics material 212 that envelops the hexagonal-shaped outer surface of the tubular inner insert 130 establishes a rigid driving connection between the inner insert 130 and the surround plastics material 212. Moreover, the projections 212a, 212b of plastics material that extend into the groove segments 134, 136 enhance the rigid character of this driving connection and assure that the sleeve-like inner insert 130 will not move axially with respect to the surrounding plastics material 212.

The outer, disc-like metal insert 160 is an annular structure that defines a radially-extending central web 166 which interconnects the inner and outer edge portions 162, 164 that have been bent as by stamping to extend out of the plane of the central web 166. The inner and outer edge portions 162, 164 of the stamped disc-like outer insert 160 preferably define a plurality of circumferentially spaced anchor formations that serve to enhance the rigidity and secure nature of the driving connection that is established between the inner and outer edge portions 162, 164 and the enveloping plastics material 212, 214.

Referring to FIGS. 17 and 18, a flat blank of sheet metal 260 is shown from which the disc-like outer insert 160 is formed. The blank 260 can be formed from substantially any selected gage thickness of commercially available sheet metal, with galvanized steel of about 12 or 14 gage being appropriate for use in forming most pulleys having an outer diameter of about 2 inches to about 6 inches. Thicker sheet stock is preferred for use with larger diameter pulleys, with 10 gage being sufficiently thick for use with most large diameter pulleys. Thinner sheet stock is preferred for use with pulleys of very small diameter, with the thickness of the sheet stock being scaled down in accordance with the diameter of the pulley, whereby 20 or 22 gage sheet stock is usually appropriate in forming pulleys of less than an inch in diameter.

Anchoring formations for securing inner and outer end regions of the disc-like outer insert 160 to the enveloping plastics material are preferably formed either in stamping the blank 260 to define its preliminary configuration as is depicted in FIGS. 17 and 18, or in stamping the blank 260 to form its final configuration as is depicted in FIGS. 19-21. In FIGS. 17-18, it will be seen that inner and outer rings of holes 282, 284 are formed through the material of the blank 260 in defining the blank's preliminary configuration. The holes 282, 284 are deformed during the final stamping of the blank 260 to define through-like notches 292, 294 that straddle lines of juncture between the planar central portion 166 of the disc-like outer insert 160 and the inner and outer edge portions 162, 164. These anchoring formations 292, 294 are caused to be filled by plastics material 212, 214 when the inner and outer edge portions 162, 164 are enveloped by injection molded plastics material, as will be explained shortly, whereby very secure driving connections are established between the inner and outer edge portions 162, 164 and the enveloping plastics material 212, 214.

Referring to FIG. 17, additional holes 290 may be formed in a symmetrical array about the center of the blank 260, with the symmetrical arrangement of these holes being desirable in order to preserve the balance of the resulting pulley 100. As is typically illustrated in FIG. 16, a threaded fastener such as a cap screw 302 can be inserted through each of the holes 290 to secure the pulley 100 to adjacent rotary elements, as designated by the numeral 304.

FIGS. 22-24, 25-27 and 28-30 illustrate three other typical embodiments 160', 160", and 160''' that can be utilized in place of the previously described embodiment 160 of the outer insert. The embodiment 160' of FIGS. 22-24 has inner and outer edge portions that define wave-like anchoring formations 310 that project into the enveloping plastics materials 212, 214 at varying angles to establish secure driving connections. The embodiment 160" of FIGS. 25-27 has inner and outer edge portions that define notched anchor formations 312 that are engaged by the enveloping plastics materials 212, 214 to establish secure driving connections. The embodiment 160''' of FIGS. 28-30 has arrays of holes 314 that are formed through the inner and outer edge portions, into which the enveloping plastics materials 212, 214 enter to establish secure driving connections. As will be apparent to those skilled in the art, other types, kinds and combinations of formations can be used to provide suitable means to anchor the inner and outer edge portions of the disc-like outer insert to the enveloping plastics material.

The method by which a rotary drive member that embodies the preferred practice of the present invention is formed is quite simple. Such preform inserts as are to be enveloped by plastics material (e.g., the inserts 130, 160) are inserted into a mold (not shown) that has a cavity which defines the desired outer shape of the drive member that is to be formed (e.g., the pulley 100). The dimensions of the cavity are adjusted as is conventional to accommodate shrinkage of the plastics material as it cools, whereby the resulting drive member will have final molded dimensions that are in accordance with what is intended. Opposite ends of the sleeve-like inner insert 130 are closed off by opposite side portions of the mold cavity; likewise, such side surface areas of the annular disc-like outer insert 160 as is to be exposed (i.e., not covered by overlying plastics material) is directly engaged by portions of the structure that define the mold cavity, whereby no plastics material is caused to flow along these side surface areas. The gates that feed molten plastics material into the mold during an injection molding process preferably communicate with mold cavity portions that define the radially extending spokes 216 that interconnect the plastics material that surrounds the inner and outer edge regions 162, 164 of the disc-like outer insert member 160. Thus, the injection molding process that is used to form the rotary drive element 100 is quite conventional except inasmuch as perform metal inserts are placed in the mold cavity prior to injection of molten plastics material.

As will be apparent from the foregoing description, the system of the present invention provides a novel and improved form of rotary drive element that is a combination of plastics material that is injection molded so as to envelope selected portions of one or more preform inserts, with the preform inserts preferably being formed from metal so that the resulting structure is a combination of plastics and metal components. The system of the present invention enables a rotary drive member to be formed quite inexpensively as a combination of one or more preform inserts and injection molded plastics materials, and yet the resulting rotary drive member is capable of transmitting relatively high torque for example between a shaft on which the member is mounted and a drive element that engages the drive formation of the rim. In preferred practice where a inner and outer metal inserts of the type described above are used, the resulting rotary drive member is light in weight and yet remarkably durable and long-lived in operation.

A further feature of the preferred practice of the invention resides in the provision of inexpensively formed rotary drive members that have radially extending webs which are defined principally by stamped metal discs that are securely, rigidly connected to hub and rim portions that are molded from plastics materials, whereby the stamped metal discs perform much of the function of transmitting torque forces between the hub and the rim.

Still another feature of the preferred practice of the invention resides in the use of a metal disc-like member to form radially extending web portions of a rotary drive member, with opposed sides of the metal disc-like member being exposed (i.e., not covered by or embedded within molded plastics material) at selected locations whereby direct metal-to-metal connections can be made between the exposed web portions and other adjacent rotary components as by extending threaded fasteners and the like through holes that are formed in the exposed metal web portions.

All of these features combine particularly well when utilized to form timing belt pulleys that are light in weight, durable and long-lived in operation, and yet capable of transmitting high torque loads.

While the rotary drive member that has been shown in the drawings takes the form of a timing belt pulley, it will be understood that the practice of the present invention is not limited to use with timing, belt pulleys, but rather can be utilized with a wide variety of rotary drive elements such as wheels, pulleys gears and the like. Accordingly, where such terms as "rotary drive member," "wheel," "gear," "pulley" and the like are used in describing products that embody features of the invention, it will be understood that the features of the invention also can be utilized with other forms of rotatable members such as rotatable threaded parts (e.g., pipe caps and plugs), roller end structures, and the like.

Likewise, while set screws 80 have been described as being used with the preferred embodiment for connecting the hub of a rotary drive member to a shaft, it will be understood that other conventional forms of fasteners that commonly are used to drivingly connect a pulley to a shaft (such as keys inserted in keyways, pins installed in aligned hole formations, etc.) also can be used either in place of the set screws 80 or in conjunction therewith, as may be desired.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A rotatable drive member formed from plastics material that is molded about portions of at least a pair of preform metal insert members which have been formed prior to the molding of the plastics material to provide a rigid drive member structure that consists of plastic and metal components that cooperate to define a hub portion of the drive member that can be mounted on a shaft for rotation about the axis of the shaft, a rim portion of the drive member that extends concentrically about the hub portion at a location spaced radially with respect to the hub portion, and a radially extending web portion of the drive member that rigidly interconnects the hub portion and the rim portion, the drive member comprising:
   (a) a preform inner metal insert that comprises elongate tubular means formed from metal for defining at least a part of a hub portion of the rotatable drive member for mounting the drive member on a shaft for rotation about the axis of the shaft, and for defining outer surface formation means of non-circular cross-section extending perimetrically about at least a part of the preform inner metal insert for drivingly engaging such plastics material as may be molded in site about the outer surface formation means;
   (b) a preform outer metal insert that comprises annular disc-like means formed from metal for surrounding portions of the inner metal insert and extending generally coaxially with respect to the tubular means about the axis of the shaft, with the annular disc-like means having inner and outer edge formation means for defining an inner diameter region and an outer diameter region, respectively, of the annular disc-like member, and for drivingly engaging such plastics material as may be molded in situ about the inner and outer edge formation means; and,
   (c) a one-piece plastic member that has been formed from plastics material molded in situ about the outer surface formation means of the preform inner metal insert, and about the inner and outer edge formation means of the preform outer metal insert, with the plastics material enveloping outer surface formation means of the preform inner metal insert and enveloping portions of the inner and outer edge formation means of the preform outer metal insert and making intimate engagement therewith to establish a rigid driving connection between the plastics material of the one-piece plastic member and the inner and outer metal inserts, and with the molded configuration of the one-piece plastic member:
      (i) defining a rim portion of the drive member that extends concentrically about the hub portion at a location spaced radially outwardly from the hub portion, and that has drive formation means extending circumferentially about the outer edge formation means for drivingly engaging another drive element; and,
      (ii) cooperating with the material of the outer metal insert member to define a radially extending web portion that extends between the hub portion and the rim portion, with exposed outer surfaces of the web portion being cooperatively defined in part by outer surface portions of the molded plastics material and by outer surfaces portions of the preform outer metal insert.

2. A rotatable drive pulley formed from plastics material that is molded about portions of inner and outer metal inserts that have been formed prior to the molding of the plastics material, comprising:
   (a) a preform inner metal insert that comprises an elongate tubular sleeve-like piece of metal having an inner surface that defines a hole for receiving a shaft to mount the drive member for rotation about the axis of the shaft, and an outer surface that defines non-circular formation means for drivingly engaging injection molded plastics material;
   (b) a preform outer metal insert that comprises an annular disc-like member that is formed by stamping a blank of sheet metal such that inner and outer edge, portions of the blank which define the inner and outer diameter of the annular disc-like member are bent out of the plane of the remainder of the sheet metal blank, with the preform outer metal insert extending about the outer surface of the preform inner metal insert but with the inner edge portions of the preform outer metal insert spaced from the outer surface of the preform inner metal insert, and with said plane of the remainder of the blank extending substantially orthogonally with respect to the axis of the shaft about which the preform inner metal insert mounts the drive member for rotation;
   (c) a one-piece member that has been formed from plastics material injection molded in situ about the outer surface of the preform inner metal insert, and about the inner and outer edge portions of the preform outer metal insert, with the plastics material cooperating with the preform inner metal insert to form hub means for extending about the shaft, and cooperating with the preform outer metal insert to form ring-like rim means that extends coaxially about the hub means in radial spaced relationship thereto in the vicinity of the outer edge portions; and, (d) drive formation means defined by the plastics material and extending circumferentially about the rim means for drivingly engaging another drive element.

3. The rotatable drive member of claim 1 wherein:
(a) the preform inner metal insert includes a sleeve-like member that has an inner diameter that is configured to receive a shaft for mounting the rotatable drive member on a received shaft for rotation about the axis of the received shaft;
(b) the inner edge formation means of the annular disc-like means surrounds and extends into proximity with the outer surface formation means of the sleeve-like member; and,
(c) the molded plastics material of the one-piece plastic member extends about the outer surface formation means of the sleeve-like member and about the inner edge formation means of the annular disc-like means to establish rigid driving connections among the the one-piece plastic member, the preform inner metal insert and the preform outer metal insert.

4. The rotatable drive member of claim 3 wherein anchoring formation means is formed in the outer surface formation means of the sleeve-like member for enhancing the character of the rigid driving connection that is established between the sleeve-like member and the molded plastics material of the one-piece plastic member.

5. The rotatable drive member of claim 1 wherein the drive formation means defines drive surface means configured for drivingly engaging a matingly configured drive formation that is defined by another drive element.

6. The rotatable drive member of claim 5 wherein the drive formation means includes drive surface means that is in the form of a toothed surface having a plurality of regularly spaced tooth means for drivingly engaging a matingly configured toothed drive formation on said another drive element.

7. The rotatable drive member of claim 6 wherein the drive surface means is configured to drivingly engage a toothed timing belt, and said another drive element is a toothed timing belt.

8. The rotatable drive member of claim 1 wherein the outer edge formation means of the annular disc-like means define anchoring formation means for enhancing the character of the rigid driving connection that is established between the outer edge formation means and such portions of the plastics material as envelope the outer edge formation means.

9. The rotatable drive member of claim 8 wherein the anchoring formation means includes a plurality of notch formations located at spaced positions about peripheral portions of the annular disc-like means.

10. The rotatable drive member of claim 8 wherein the anchoring formation means includes a plurality of openings formed through edge portions of the annular disc-like means.

11. The rotatable drive member of claim 1 additionally including hole means formed through portions of the annular disc-like means that define portions of the radially extending web for connecting the rotary drive member to an adjacent rotary drive component.

12. A timing belt pulley formed from a single, contiguously-extending, one piece member consisting of plastics material that has been injection molded about portions of a preform inner metal insert and a preform outer metal insert to provide a rigid structure of plastic and metal components, comprising:
(a) a preform inner metal insert that comprises an elongate tubular sleeve-like piece of metal having an inner surface that defines a hole for receiving a shaft to mount the pulley for rotation about the axis of the shaft, and an outer surface that defines non-circular formation means for drivingly engaging injection molded plastics material;
(b) a preform outer metal insert that comprises an annular disc-like member that is formed by stamping a blank of sheet metal such that inner and outer edge portions of the blank which define the inner and outer portions of the blank which define the inner and outer diameter of the annular disc-like member are bent out of the plane of the remainder of the sheet metal blank, with the outer metal insert extending about the outer surface of the preform inner metal insert but with the inner edge portions spaced from the outer surface of the preform inner metal insert, and with said plane of the remainder of the blank extending substantially orthogonally with respect to the axis of the shaft about which the preform inner metal insert mounts the pulley for rotation;
(c) a one-piece member that has been formed from plastics material injection molded in situ about the outer surface of the preform inner metal insert, and about the inner and outer edge portions of the preform outer metal insert, with the plastics material forming a ring-like rim in the vicinity of the outer edge portions; and,
(d) the plastics material additionally defining drive formation means extending circumferentially about the rim for drivingly engaging another drive element.

13. The timing belt pulley of claim 12 wherein the outer edge portions of the preform outer metal insert define anchoring formation means for enhancing the character of the rigid driving connection that is established between the outer edge portions and the enveloping plastics material.

14. The timing belt pulley of claim 13 wherein the anchoring formation means includes a plurality of notch formations located at spaced positions about peripheral portions of the preform outer metal insert.

15. The timing belt pulley of claim 13 wherein the anchoring formation means includes a plurality of openings formed through edge portions of the preform outer metal insert.

16. The rotatable drive pulley of claim 2 wherein the drive formation means defines drive surface means configured for drivingly engaging a matingly configured drive formation that is defined by another drive member.

17. The rotatable drive pulley of claim 16 wherein the drive formation means includes drive surface means that is in the form of a toothed surface having a plurality of regularly spaced tooth means for drivingly engaging a matingly configured toothed drive formation on said another drive element.

18. The rotatable drive pulley of claim 17 wherein the drive surface means is configured to drivingly engage a toothed timing belt, and said another drive element is a toothed timing belt.

19. The rotatable drive pulley of claim 2 wherein the outer edge formation means of the preform outer metal insert define anchoring formation means for enhancing the character of the rigid driving connection that is established between the outer edge formation means and such portions of the plastics material as envelope the outer edge formation means.

20. The rotatable drive pulley of claim 19 wherein the anchoring formation means includes a plurality of notch formations located at spaced positions about peripheral portions of th preform outer metal insert.

21. The rotatable drive pulley of claim 19 wherein the anchoring formation means includes a plurality of openings formed through edge portions of the preform outer metal insert.

22. The rotatable drive pulley of claim 2 additionally including hole means formed through portions of the outer metal insert that define portions of the radially extending web for connecting the rotary drive pulley to an adjacent rotary drive component.

23. The timing belt pulley of claim 12 additionally including hole means formed through portions of the preform outer metal insert for connecting the timing belt pulley to an adjacent rotary drive component.

24. The timing belt pulley of claim 12 wherein the molded configuration of the plastics material cooperates with surface portions of the preform inner and outer metal inserts to define outer surfaces of the timing belt pulley such that selected portions of the outer surfaces of the timing belt pulley are defined by outer surface portions of the molded plastics material while other portions of the outer surfaces of the timing belt pulley are defined by outer surface portions of the preform metal inserts.

25. The timing belt pulley of claim 12 wherein anchoring formation means is provided in the outer surface of the preform inner metal insert for enhancing the character of the rigid driving connection that is established between the preform inner metal insert and the molded plastics material.

26. The timing belt pulley of claim 25 wherein the anchoring formation means includes a plurality of spaced groove segments arranged in at least one ring-like array that extends around the circumference of a selected portion of the outer surface of the preform inner metal insert.

27. The rotatable drive member of claim 1 wherein the outer metal insert is formed as an annular disk-like stamping from a sheet of metal, with the disk-like stamping having inner and outer diameter regions that are interconnected by substantially planar radially extending portions, and with the inner and outer diameter regions of the disk-like stamping being bent out of the plane of the radially extending portions.

28. The rotatable drive pulley of claim 2 wherein the outer metal insert is formed as an annular disk-like stamping from a sheet of metal, with the disk-like stamping having inner and outer edge formation means that are interconnected by substantially planar radially extending portions, and with the inner and outer edge formation means of the disk-like stamping being bent out of the plane of the radially extending portions.

29. The rotatable drive pulley of claim 2 wherein:
(a) the preform inner metal insert includes a sleeve-like member that has an inner diameter that is configured to receive a shaft for mounting the rotatable drive pulley for rotation about the axis of the shaft, and having an outer diameter;
(b) the inner edge formation means of the outer metal insert surround and extend into proximity with the outer diameter of the inner metal insert; and,
(c) the inner portion of the molded plastics material extends about the outer diameter of the preform inner metal insert and about the inner edge portions of the preform outer metal insert to establish rigid driving connections among the plastics material and the inner and outer metal inserts.

30. The rotatable drive pulley of claim 29 wherein anchoring formation means is formed in the outer surface formation means of the sleeve-like member for enhancing the character of the rigid driving connection that is established between the inner metal insert and the molded plastics material of the one-piece plastic member.

* * * * *